(12) United States Patent
Jeon

(10) Patent No.: US 10,139,092 B2
(45) Date of Patent: Nov. 27, 2018

(54) LIGHTING ASSEMBLY

(71) Applicant: Byung Joon Jeon, Daegu (KR)

(72) Inventor: Byung Joon Jeon, Daegu (KR)

( * ) Notice: Subject to any disclaimer, the term of this patent is extended or adjusted under 35 U.S.C. 154(b) by 0 days.

(21) Appl. No.: 15/311,383

(22) PCT Filed: Jun. 24, 2016

(86) PCT No.: PCT/KR2016/006793
§ 371 (c)(1),
(2) Date: Nov. 15, 2016

(87) PCT Pub. No.: WO2016/209038
PCT Pub. Date: Dec. 29, 2016

(65) Prior Publication Data
US 2017/0175988 A1    Jun. 22, 2017

(30) Foreign Application Priority Data

Jun. 26, 2015 (KR) .......................... 10-2015-0091236
Feb. 11, 2016 (KR) .......................... 10-2016-0015480
(Continued)

(51) Int. Cl.
*F21V 23/06* (2006.01)
*F21V 17/16* (2006.01)
(Continued)

(52) U.S. Cl.
CPC ................ *F21V 23/06* (2013.01); *F21K 9/20* (2016.08); *F21V 15/01* (2013.01); *F21V 17/16* (2013.01);
(Continued)

(58) Field of Classification Search
CPC ........ F21V 23/06; F21V 23/004; F21V 23/02; F21V 15/01; F21V 17/16; F21V 17/162; F21Y 2115/10
(Continued)

(56) References Cited

U.S. PATENT DOCUMENTS

| 2,009 A * | 3/1841 | Goell ........................ F42B 4/30 86/20.11 |
| 4,648,009 A * | 3/1987 | Beun .................... H05K 7/1409 211/41.17 |

(Continued)

FOREIGN PATENT DOCUMENTS

| CN | 203202947 U | 9/2013 |
| JP | 4061479 B2 | 9/1992 |

(Continued)

*Primary Examiner* — Harshad C Patel
(74) *Attorney, Agent, or Firm* — Maschoff Brennan

(57) ABSTRACT

There is provided a lighting assembly comprising: a frame; a power supply connector coupled to the frame at and along a first inner side of the frame, wherein the power supply connector is configured to receive a power from an external power supply; a support coupled to the frame at and along a second inner side of the frame, wherein the first side is opposite to the second side; and a lighting module disposed between and coupled to the power supply connector and the support, wherein the lighting module is configured to receive the power from the power supply connector, and the lighting module has a lighting element embedded therein, wherein the lighting module is physically supported by the support.

16 Claims, 18 Drawing Sheets

(30) Foreign Application Priority Data

May 18, 2016 (KR) .................. 10-2016-0060832
Jun. 23, 2016 (KR) .................. 10-2016-0078633

(51) Int. Cl.

| | |
|---|---|
| *F21V 15/01* | (2006.01) |
| *F21V 23/02* | (2006.01) |
| *F21V 23/04* | (2006.01) |
| *F21V 19/00* | (2006.01) |
| *F21V 19/04* | (2006.01) |
| *F21K 9/20* | (2016.01) |
| *F21Y 115/10* | (2016.01) |
| *F21Y 115/15* | (2016.01) |
| *H01R 13/24* | (2006.01) |
| *H01R 33/18* | (2006.01) |
| *F21Y 113/00* | (2016.01) |

(52) U.S. Cl.
CPC ............ *F21V 19/001* (2013.01); *F21V 19/04* (2013.01); *F21V 23/02* (2013.01); *F21V 23/04* (2013.01); *F21Y 2113/00* (2013.01); *F21Y 2115/10* (2016.08); *F21Y 2115/15* (2016.08); *H01R 13/2421* (2013.01); *H01R 33/18* (2013.01)

(58) Field of Classification Search
USPC .................. 439/81; 362/217.11, 217.15
See application file for complete search history.

(56) References Cited

U.S. PATENT DOCUMENTS

| | | | | |
|---|---|---|---|---|
| 6,314,669 | B1* | 11/2001 | Tucker | G09F 9/33 340/815.45 |
| 6,340,320 | B1* | 1/2002 | Ogawa | H01R 13/2421 29/511 |
| 6,634,124 | B1* | 10/2003 | Bierschbach | G09F 9/33 40/452 |
| 6,802,117 | B2* | 10/2004 | Dalisay | H05K 7/1409 29/729 |
| 6,981,886 | B1* | 1/2006 | Co | H01R 13/62988 439/152 |
| 7,201,613 | B2* | 4/2007 | Sasaki | H01R 13/2421 439/700 |
| 7,435,109 | B1* | 10/2008 | Sugiura | H01R 13/2421 439/700 |
| 7,481,569 | B2* | 1/2009 | Chang | G02F 1/133608 362/300 |
| 7,789,719 | B1* | 9/2010 | Yin | G01R 1/06722 439/700 |
| 8,087,950 | B1* | 1/2012 | Deng | H01R 13/6275 439/328 |
| 8,182,288 | B1* | 5/2012 | Lin | H01R 13/6588 439/607.01 |
| 8,640,369 | B2* | 2/2014 | Dysart | G09F 9/33 362/217.15 |
| 8,888,306 | B2* | 11/2014 | Thomas | F21V 15/013 362/217.01 |
| 8,919,996 | B2* | 12/2014 | Kim | F21K 9/13 362/249.02 |
| 2002/0160637 | A1* | 10/2002 | Ishizuka | H01R 13/2421 439/131 |
| 2008/0244944 | A1* | 10/2008 | Nall | G09F 13/04 40/544 |
| 2011/0068709 | A1* | 3/2011 | Ing | F21K 9/00 315/294 |
| 2013/0135537 | A1* | 5/2013 | Kuromizu | G02B 6/0011 348/790 |
| 2013/0229802 | A1* | 9/2013 | Fukushima | F21V 19/003 362/235 |
| 2013/0265746 | A1* | 10/2013 | May | F21S 8/04 362/218 |

FOREIGN PATENT DOCUMENTS

| | | |
|---|---|---|
| JP | 2008-171611 A | 7/2008 |
| JP | 2009-187841 A | 8/2009 |
| KR | 20-0295423 Y1 | 11/2002 |
| KR | 10-0894258 B1 | 4/2009 |
| KR | 20-2010-0004587 U | 5/2010 |
| KR | 10-1595955 B1 | 2/2011 |
| KR | 10-2011-0097212 A | 8/2011 |
| KR | 10-1092612 B1 | 12/2011 |
| KR | 10-1295829 * | 8/2012 |
| KR | 20-0463240 Y1 | 10/2012 |

* cited by examiner

LIGHTING ASSEMBLY

BACKGROUND

Field of the Present Disclosure

The present disclosure relates to a lighting assembly, and, more particularly, to a lighting assembly wherein a lighting module having a light emitting unit with planar emission such as LED, GELD is readily attached or detached to and from an assembly frame.

Discussion of Related Art

In general, a lighting device such as a light lamp, an incandescent lamp, and a halogen lamp is used in a state where it is attached to a ceiling or a wall surface of an interior of a room in a home or an office space.

Such an indoor lighting lamp has high power consumption, heat emission, etc. It has a short life span of about 6 months and has a disadvantage of frequent replacement. In particular, fluorescent lamps or incandescent lamps are subject to breakage, which makes them difficult to collect, and there is also a problem of environmental pollution due to damage during collection.

On the other hand, LED (light emitting diode) may be a high efficiency light source having low power consumption and no heat emission, and has a long lifetime of about 100,000 hours. Thus, it is attracting attention as a next generation lighting device.

Korean utility model registration number 20-0463240 (2012.10.18) discloses a portable LED lighting device wherein a plurality of LEDs are illuminated by an operation of pressing a one-touch button switch protruding from one end of a lamp case to illuminate products displayed on a shelf through a plurality of illumination holes formed at regular intervals in the lamp case. The portable LED lighting device includes a plurality of LEDs accommodated in a main body at regular intervals; a plurality of batteries removably disposed in the plurality of reception portions formed between the plurality of LEDs; a LED lighting module body having a printed circuit board mounted therein, on which the plurality of LEDs, batteries and one-touch button switch are soldered in a closed circuit state; a hollow portion to detachably receive the LED lighting module body; a lighting device case having a plurality of illumination holes defined therein for illuminating light emitted from each of a plurality of LEDs provided in the LED lighting body toward the product display shelf; a finish cap to be inserted into the other end of the lighting device case and having a female screw formed thereon to be screw-fastened to a male screw protruding from the other end of the LED lighting main body, wherein the finish cap closes or open the other end of the lighting device case; a lighting device installation means having a mounting groove to receive removably the lighting device case, wherein the lighting device installation means is fixed to the wall or the bottom of the display shelf, wherein the light emitting from the plurality of LEDs formed on the main body illuminates the product display shelf.

As for the conventional lighting apparatus as described above, it is difficult for the non-skilled person such as a child or a housewife to attach or detach the light emission unit such as LED or lamp to or from the light device frame.

In the above-described conventional lighting apparatus, when a portion of the LED chip as the light emitting means is damaged, an entirety of the light emitting means should be replaced. This leads to resources waste.

SUMMARY

The present disclosure is to provide a lighting assembly wherein a lighting module having a light emitting unit with planar emission such as LED, OELD is readily attached or detached to and from an assembly frame.

In one aspect of the present disclosure, there is provided a lighting assembly comprising: a frame; a power supply connector coupled to the frame at and along a first inner side of the frame, wherein the power supply connector is configured to receive a power from an external power supply; a support coupled to the frame at and along a second inner side of the frame, wherein the first side is opposite to the second side; and a lighting module disposed between and coupled to the power supply connector and the support, wherein the lighting module is configured to receive the power from the power supply connector, and the lighting module has a lighting element embedded therein, wherein the lighting module is physically supported by the support.

In one implementation, the power supply connector comprises: a connector body coupled to the frame at and along the first inner side of the frame, wherein the connector body has at least two engaged grooves defined therein; and at least two electrical contacting means received in the at least two engaged grooves respectively, wherein when the lighting module is partially inserted into the engaged grooves, the electrical contacting means applies an elastic force to the lighting module, and the electrical contacting means supplies the power to the lighting module.

In one implementation, the electrical contacting means includes: a first electrical delivery member received in each engaged groove, wherein the first electrical delivery member receives a power from the external power supply; a contact plate received in each engaged groove to translate along and in each engaged groove, wherein the contact plate contacts the lighting module and supplies the power to the lighting module; and a first elastic member disposed between the electrical delivery member and the contact plate, wherein the first elastic member is fixed to the electrical delivery member and the contact plate, wherein when the lighting module is partially inserted into the engaged grooves, the first elastic member applies an elastic force to the contact plate, wherein the power passes from the external power supply via the electrical delivery member, and, then, the first elastic member, and, then, the contact plate, to the lighting module.

In one implementation, the lighting module includes: two contacting plugs to be engaged into the power supply connector; a module body coupled to the contacting plugs, wherein the module body includes a lighting emitting unit; and an elastic bar coupled to the module body, wherein the elastic bar is engaged with the support, wherein the elastic bar is disposed between the module body and the support.

In one implementation, each of the contacting plugs includes: a terminal pin having a distal free end to be coupled to the power supply connector connecting means coupled to the module body, wherein the connecting means has a through hole through which the terminal pin is slidably inserted; a slider fixed to the terminal pin such that the slider slides together with the terminal pin, wherein the connecting means has a groove to receive the slider such that the slider slidably moves in the groove in the connecting means, wherein the slider returns to its initial position due to a restoring force of a first elastic member; and the first elastic member disposed between the connecting means and slider, wherein the first elastic member is configured to apply the elastic force to the slider.

In one implementation, the elastic bar includes a support body, a movable body and at least one second elastic member, wherein the support body has one elongate side coupled to the module body, and the other opposite side coupled to the movable body, wherein the movable body is coupled to the support on one end of the movable body, and the movable body is movably coupled to the module body on the other opposite end thereof, and, the movable body returns to its original position using the second elastic member, wherein the second elastic member is disposed between the support body and movable body, wherein the second elastic member applies the elastic force to the movable body.

In one implementation, the lighting module includes a connecting means support, two second electrical contacting means and a module body, wherein the connecting means support supports the two second electrical contacting means, wherein the connecting means support has two slide grooves defined therein to receive the two second electrical contacting means respectively, wherein when the two second electrical contacting means are pressure-engaged into the power supply connector, the two second electrical contacting means applies the elastic force to the power supply connector, wherein the second electrical contacting means is electrically coupled to the power supply connector to supply the power from the power supply connector to the module body, wherein the module body is coupled to the connecting means support on one end thereof, and the module body includes light emitting means embedded therein.

In one implementation, each of the second electrical contacting means includes a second electrical delivery member, a terminal member and a second elastic member, wherein the second electrical delivery member is received in the slide groove, wherein the second electrical delivery member is configured to receive the power from the power supply connector and supply the power to the module body, wherein the terminal member has an accommodation groove defined therein to receive the corresponding second elastic member, wherein the terminal member translates along and in the slide groove, wherein the terminal member has a free end to contact the power supply connector to transfer the power from the power supply connector via the second electrical delivery member to the module body, wherein the second elastic member is received in the accommodation groove in the terminal member, wherein the second elastic member applies the elastic force to the terminal member when the terminal member is engaged into the power supply connector.

In one implementation, the assembly further comprises a handle member formed on either or both of two opposite elongate sides of the lighting module, wherein the handle member is raised up or lowered down to engage the lighting module with the power supply connector or separate the lighting module from the power supply connector.

In one implementation, the support includes a housing member coupled to the frame, wherein the housing member has a recess defined to receive a portion of the lighting module.

In one implementation, the support further includes an elastic member received in the recess, wherein when the recess receives a portion of the lighting module, the elastic member applies the elastic force to the lighting module.

In one implementation, the elastic member includes an elastic unit and a cover unit, wherein the elastic unit is received in the recess, wherein the elastic force is applied to the lighting module using a restoring force of the elastic unit when the lighting module is engaged into the recess, wherein the cover unit is fixed to the elastic unit on one side thereof, and the cover unit contacts the lighting module on the other opposite side thereof, wherein the cover unit transfers a push force from the lighting module to the elastic unit.

In one implementation, the housing member further includes a push mechanism disposed in the recess, wherein the lighting module is pushed using the push mechanism.

In one implementation, the push mechanism includes a pusher and a spring, wherein the pusher is disposed in the recess and translates in the recess to push the lighting module in a front direction of the lighting module, wherein the spring is fixed to the pusher at one end of the spring and is fixed to an inner side of the recess at the other end of the spring, wherein when the lighting module is pushed out of the recess, the spring applies the elastic force to the pusher.

In one implementation, the recess has an inner tilted face.

In one implementation, the housing member has a "L" shape, wherein the housing member is engaged into a corner of the lighting module.

In one implementation, the housing member receives a plurality of elastic members therein.

In accordance with the present disclosure, the lighting module having a light emitting unit with planar emission such as LED, OELD is readily attached or detached to and from the assembly frame. Thus, the non-expert may easily attach or detach the light emitting unit to or from the frame.

Further, in accordance with the present disclosure, when the module body having the light emitting unit with a planar emission is to be replaced, not the frame but only the module body may be replaced. Thus, the electrical risk when the frame is replaced may be prevented.

Furthermore, in accordance with the present disclosure, as for the lighting assembly, the lighting module may be freely positioned along the length of the power supply connector in the frame so as to allow an accurate adjustment of a light source positioning and thus, an emission amount and thus a power consumption thereof.

Furthermore, in accordance with the present disclosure, when a certain LED chip as the light emitting means is damaged, not an entirety of the lighting module but only the damaged LED chip may be replaced. This avoids resources waste.

DETAILED DESCRIPTIONS

Figure 1:
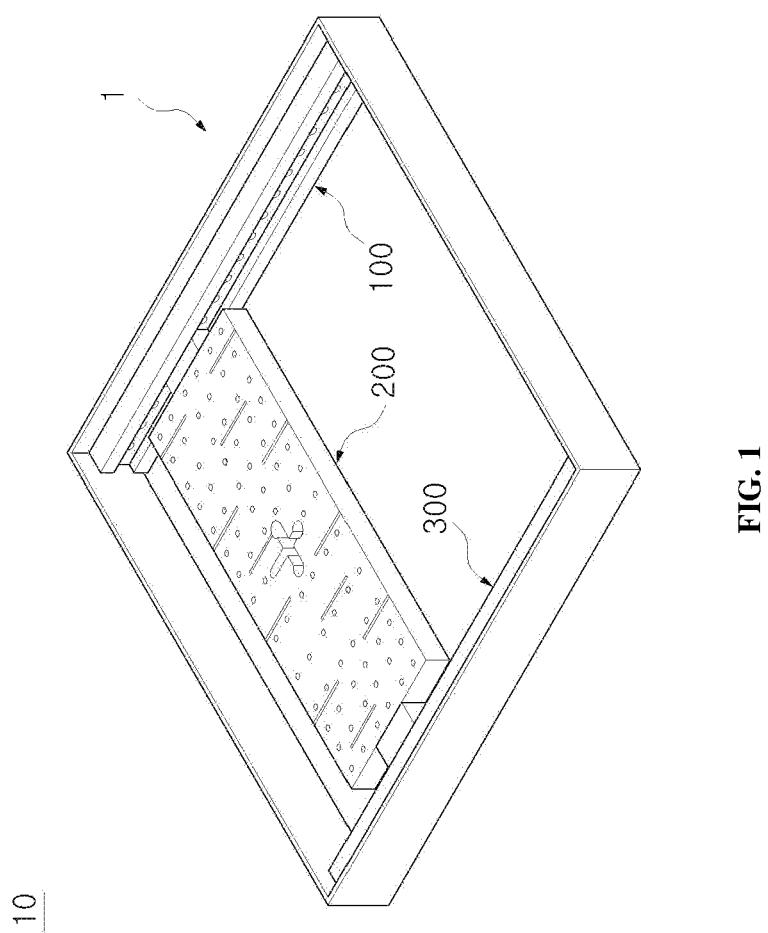
FIG. 1 and FIG. 2 shows perspective views of lighting assemblies in accordance with a first embodiment of the present disclosure.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "substantially," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Hereinafter, various embodiments of a lighting assembly of the present disclosure will be described in details.

Figure 2:
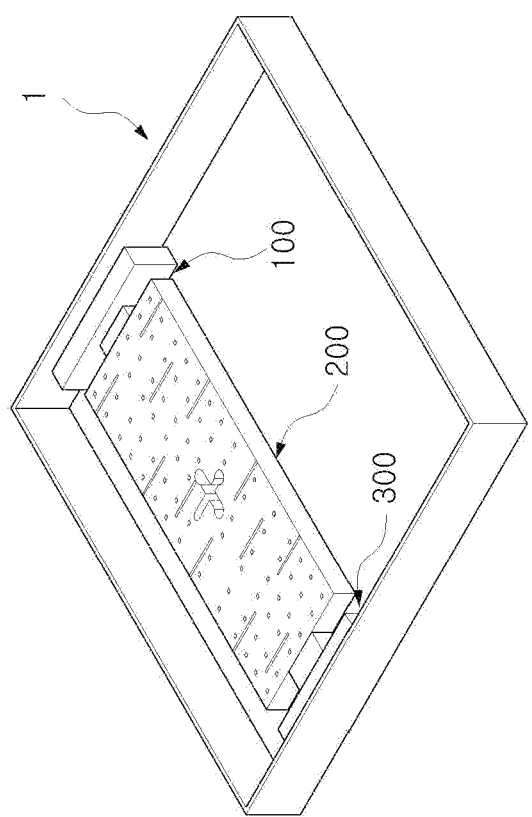

FIG. 1 and FIG. 2 shows perspective views of lighting assemblies in accordance with a first embodiment of the present disclosure.

Referring to FIG. 1 and FIG. 2, the lighting assembly 10 may include a power supply connector 100, a lighting module 200 and a support 300.

The power supply connector 100 may be disposed on an inner side of a frame 1. The power supply connector 100 may be spaced from the support 300 with the lighting module 200 being interposed therebetween. The power supply connector 100, lighting module 200 and support 300 may be arranged in a single plane. The power supply connector 100 may be electrically connected to a power supply, for example, an external power supply or internal battery to supply the power to the lighting module 200.

In one implementation, the power supply connector 100 as shown in FIG. 1, may extend in a length of one side of the frame 1 to have a plurality of first electrical contacting means 120 arranged along the length thereof to electrically contact the lighting module 200. Thus, the user may position the lighting module 200 at selected one of the plurality of first electrical contacting means 120. Alternatively, as shown in FIG. 2, only a pair of first electrical contacting means 120 may be formed in the power supply connector 100, wherein the position of the lighting module 200 may be fixed.

The lighting module 200 may have one end coupled to the power supply connector 100 and the other opposite end coupled to the support 300. The lighting module 200 may receive the power from the power supply connector 100 to emit light beams.

In one implementation, the lighting module 200 may have a DC converter circuit to convert an AC current received from the power supply connector 100 to a DC current.

The support 300 may be disposed on an opposite inner side of the frame 1 to the power supply connector 100. Thus, the lighting module 200 may be disposed between the support 300 and the power supply connector 100. The support may be configured to support the lighting module 200.

The lighting assembly 10 may be configured such that the lighting module 200 may be freely positioned along the length of the power supply connector 100 with the lighting module 200 being disposed between the support 300 and the power supply connector 100 while being supported by the support 300. Further, a width of the lighting module 200 in a direction of the length of the power supply connector 100 may vary.

The lighting module 200 may have a lighting element to realize planar emission such as LED or OELD elements. The lighting module 200 may be easily detachably attached to the frame 1.

As for the lighting assembly 10, the lighting module 200 may be freely positioned along the length of the power supply connector 100 in the frame 1 so as to allow an accurate adjustment of a light source positioning and thus, an emission amount and thus a power consumption thereof.

Using the above-configured lighting assembly 10, the light emitting element, such as a LED chip fails in a certain lighting module 200, only the certain lighting module 200 may be replaced, thereby avoid the replacement of an entire number of the lighting modules 200.

As for the above-configured lighting assembly 10, the lighting module 200 may have a DC converter embedded therein. Thus, this may remove the need for an external DC converter.

Figure 3:
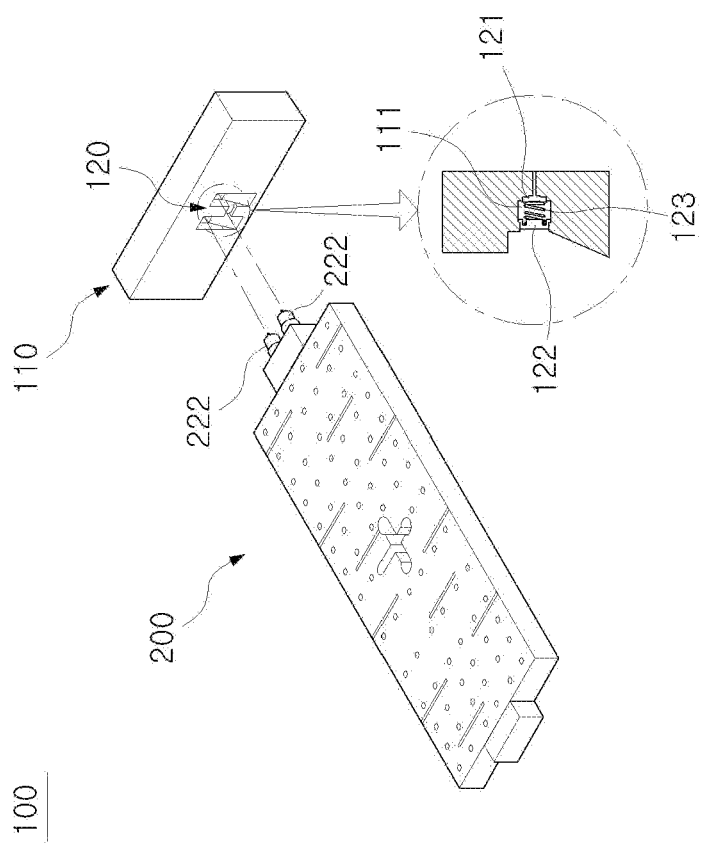
FIG. 3 shows a power supply connector in accordance with an embodiment of the present disclosure.

FIG. 3 shows a power supply connector in accordance with an embodiment of the present disclosure.

Referring to FIG. 3, the power supply connector 100 may include a connector body 110 and first electrical contacting means 120 embedded in the body 110.

The connector body 110 may be coupled to the frame 1 on the inner side thereof to extend in a length of the inner side thereof. The connector body 110 may support the lighting module 200. The connector body 110 may have a pair of two engaged grooves 111 defined therein to receive terminal pins of the lighting module 200 as described below. When the engaged grooves 111 receive the terminal pins of the lighting module 200 respectively the connector body 110 may be electrically coupled to the lighting module 200.

In one implementation, the connector body 110 may have a tilted portion around each of the engaged grooves 111 to allow an easy guide and insertion of each of the terminal pins of the lighting module 200 into the groove 111. In one example, the tilted portion may have a tilt angle of 10° to 30°. This is shown in FIG. 3.

The first electrical contacting means 120 may be contained in the corresponding engaged groove 111 defined in the connector body 110. The first electrical contacting means 120 may be configured to deliver the power from an external power supply to the lighting module 200. In particular, when the terminal pins of the lighting module 200 are engaged into the engaged grooves 111 respectively, the first electrical contacting means 120 may be configured to elastically push against the inserted pins of the lighting module 200.

In one implementation, the first electrical contacting means 120 may include a first electrical delivery member 121, a contact plate 122 and a first elastic member 123.

The first electrical delivery member 121 may have a plate portion received in the engaged groove 111 and an extension portion embedded in the connector body 110 to be electrically connected to the external power supply. In this connection, one of two first electrical delivery members 121 may receive a first power from the external power supply, while the other of the first electrical delivery members 121 may receive a second power from the external power supply.

In one implementation, the first electrical delivery member 121 may receive a DC power from a DC power supply, for example, an external power supply or internal battery. In one implementation, the first electrical delivery member 121 may receive an AC power from an AC power supply.

Figure 4:
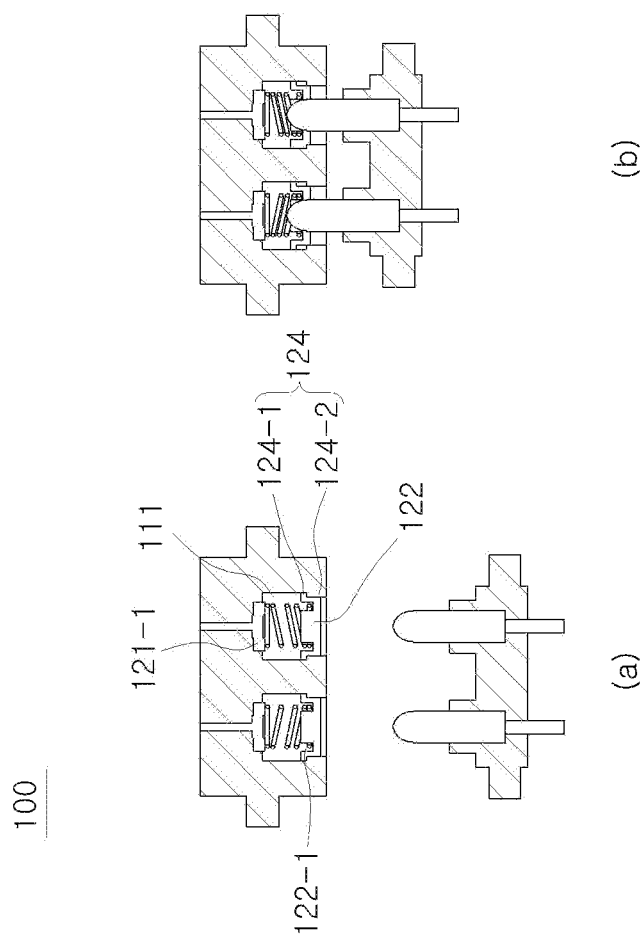
FIG. 4 illustrates an operation of the power supply connector in accordance with an embodiment of the present disclosure.

In one implementation, the first electrical delivery member 121 may have a protrusion 121-1 on the plate portion thereof to allow a secure coupling with the first elastic member 123, as shown in FIG. 4. To this end, the protrusion 121-1 may be engaged with one open end of the first elastic member 123. In one example, the protrusion 121-1 may be bonded with the end of the first elastic member 123 using a heat-bonding.

The contact plate 122 may be contained in the engaged groove 111 to face away the plate portion of the first electrical delivery member 121. Thus, the contact plate 122 may block an open end of the engaged groove. When the pins of the lighting module 200 are pushed into the engaged grooves 111 respectively, the contact plate 122 may pressure-contact the pins of lighting module 200 and may be pushed backward in an elastic manner using the first elastic member 123. In this connection, the first elastic member 123 may be made of a conductive material. Thus, the power from the first electrical delivery member 121 may be delivered via the contact plate 122 to the lighting module 200. The contact plate 122 may be made of a conductive material such as an iron, copper, etc.

In one implementation, the contact plate 122 may have an engaged groove 122-1 to receive the other end of the first elastic member 123, as shown in FIG. 4.

The first elastic member 123 may be made of a conductive and elastic material such as an iron, copper, etc. In one example, the first elastic member 123 may be implemented as a spring. The first elastic member 123 may have one end physically and electrically coupled to the first electrical delivery member 121 and the other end physically and electrically coupled to the contact plate 122. In this way, the power from the external power supply may be supplied via the first electrical delivery member 121, the first elastic member 123 and the contact plate 122 to the lighting module 200 when the lighting module 200 is engaged with the connector 100. Further, when the lighting module 200 is engaged with the connector 100, the first elastic member 123 may allow a sliding translation of the contact plate 122 along and in the engaged groove 111 in an elastic manner.

In one implementation, the first electrical contacting means 120 may further include a first stopper mechanism 124 at the contact plate to prevent the contact plate 124 from being fully removed from the groove 111, as shown in FIG. 4.

The first stopper mechanism 124 may be configured to prevent the contact plate 124 from being fully removed from the groove 111 due to a restoring force of the first elastic member 123 when the pin terminals 222 of the lighting module 200 are fully removed from the engaged grooves 111 respectively.

In one implementation, the first stopper mechanism 124 may have a first shoulder 124-1 and a first stopper protrusion 124-2 as shown in FIG. 4. The first shoulder 124-1 and first stopper protrusion 124-2 may be in a tight contact with each other to prevent the contact plate 124 from being fully removed from the groove 111 due to a restoring force of the first elastic member 123 when the pin terminals 222 of the lighting module 200 are fully removed from the engaged grooves 111 respectively.

The first shoulder 124-1 may extend inwardly from the inner side face of the engaged groove 111. In one example, the first shoulder 124-1 may extend in an annular shape around the inner perimeter of the engaged groove 111. The present disclosure is not limited thereto. In one example, multiple first sub-shoulder 124-1 may extend in an annular shape around the inner perimeter of the engaged groove and may spacedly be arranged.

The first stopper protrusion 124-2 may extend outwardly from an outer perimeter of the contact plate 122. In one example, the first stopper protrusion 124-2 may extend in an annular shape around the outer perimeter of the contact plate 122. In an operation of the first stopper mechanism 124, the first shoulder 124-1 and first stopper protrusion 124-2 may be in a tight contact with each other to prevent the contact plate 124 from being fully removed from the groove 111 due to a restoring force of the first elastic member 123 when the pin terminals 222 of the lighting module 200 are fully removed from the engaged grooves 111 respectively.

FIG. 4 illustrates an operation of the power supply connector in accordance with an embodiment of the present disclosure.

Referring to FIG. 4, as shown in FIG. 4a, the contact plate 122 may enable to prevent a contaminant from entering the engaged grooves 111 before the terminal pins of the lighting module 200 are inserted into the engaged grooves 111 respectively.

To the contrary, when the terminal pins of the lighting module 200 are inserted into the engaged grooves 111 respectively as shown in FIG. 4b, the contact plate 122 may be pushed backward in and along the engaged groove 111 and, thus, the user may easily couple the lighting module 200, at the other end thereof, to the support 300. Then, when the lighting module 200 has been coupled, at the other end thereof, to the support 300, the contact plate 122 may be returned forward in and along the engaged groove to its original state. Thus, the contact plate 122 may stably support the lighting module 200 with the support 300.

Figure 5:
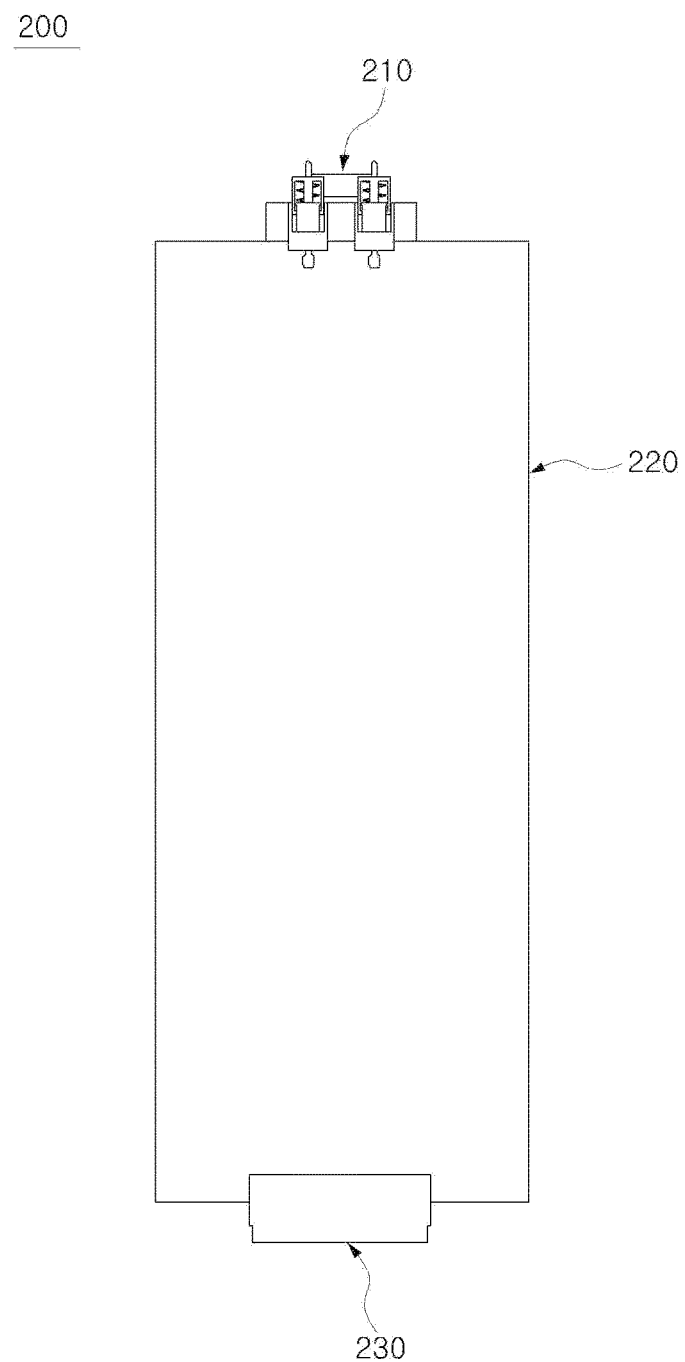
FIG. 5 shows a lighting module in accordance with a first embodiment of the present disclosure.

FIG. 5 shows a lighting module in accordance with a first embodiment of the present disclosure.

Referring to FIG. 5, the lighting module 200 may include two contacting plugs 210-1, 210-2, a module body 220 and an elastic bar 230.

Each contacting plug 210 may be formed on one end of the lighting module body 220. The contacting plug 210 may be electrically coupled to the power supply connector 100, more specifically, the first electrical contacting means 120 or second electrical contacting means 130 to receive the power from the power supply connector 100. Then, the contacting plug 210 may deliver the power to the module body 220.

The module body 220 may have two contacting plugs 210-1 and 210-2 formed at one end thereof. The elastic bar 230 may be formed on the module body 229 at the other end thereof. The module body 220 may include a power converter (not shown) to convert an AC power from the contacting plug 210 and power supply connector 100 to a DC power to supply the DC power to at least one light emitting unit, for example, a LED embedded in the module body 220.

The elastic bar 230 may be coupled to the module body 220 at the other end thereof. The elastic bar 230 may be coupled to the support 300.

Figure 6:
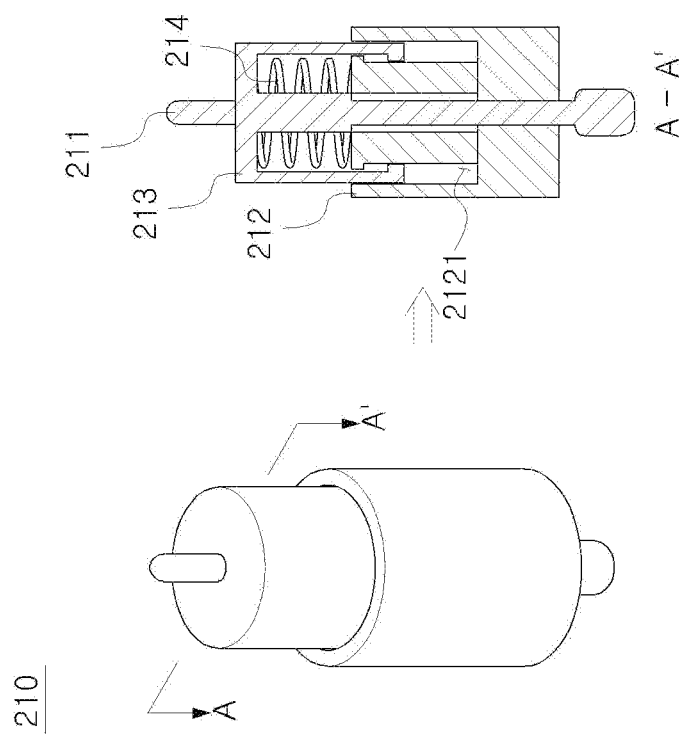
FIG. 6 and FIG. 7 illustrate contacting plugs in FIG. 5.
Figure 7:
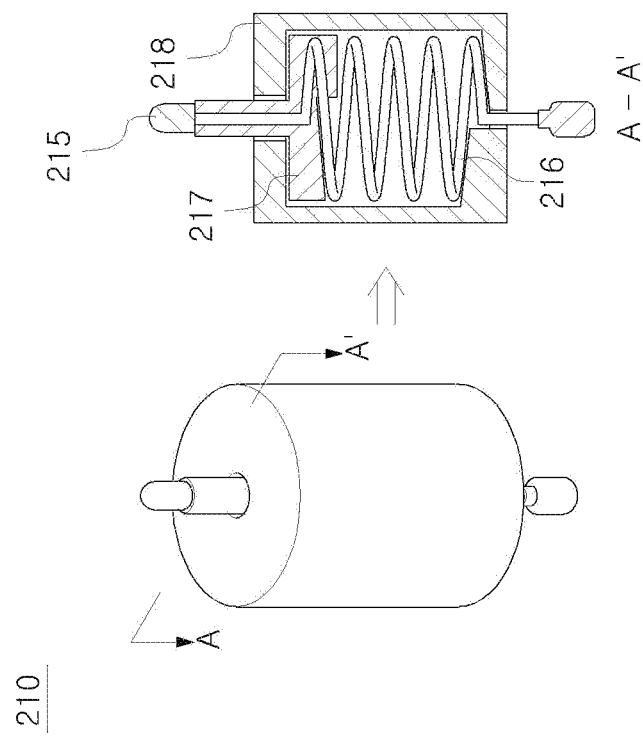

FIG. 6 and FIG. 7 illustrate contacting plugs in FIG. 5.

Referring to FIG. 6, the contacting plug 210 may include a terminal pin 211, connecting means 212, a slider 213 and a first elastic member 214.

The terminal pin 211 may have a distal free end to be coupled to the power supply connector 100 and a proximal end coupled to a power receiving portion (not shown) in the module body 220. The power receiving portion may be implemented using the power converter unit. The terminal pin 211 may have one side fixed to the slider 213 to slide together with the slider 213, and the other side inserted into a through hole in the connecting means 212 to slide therein. In this way, the contacting plug 210 may receive a power from the power supply connector 100 and supply the power to the module body 220.

The connecting means 212 may be coupled to the module body 220. The connecting means 212 may have the through hole through which the terminal pin 211 is slidably inserted.

The slider 213 may be fixed to the terminal pin 211 such that the slider 213 may slide together with the terminal pin 211. The connecting means 212 may have a groove 2121 to receive the slider 213 such that the slider 213 slidably moves in the groove 2121 in the connecting means 212. The slider 213 may return to its initial position due to the restoring force of the first elastic member 214.

In one implementation, the connecting means 212 may have a groove 2121 to receive the slider 213 such that the slider 213 slidably moves in the groove 2121 in the connecting means 212.

The first elastic member 214 may be disposed between the connecting means 212 and slider 213. The first elastic member 214 may be made of an elastic member, for example, a spring to apply the elastic force to the slider 213.

Referring to FIG. 7, the contacting plug 210 may include a terminal pin 215, a conductive spring 216, a pressure structure 217 and a housing 218.

The terminal pin 215 may be made of a conductive material. The terminal pin 215 may have a distal end coupled to the power supply connector 100 and a proximal end coupled to the conductive spring 216. The terminal pin 215 may receive the power from the power supply connector 100 and supply the power to the conductive spring 216.

The conductive spring 216 may be made of a conductive material. The conductive spring 216 may have a distal end coupled to the terminal pin 215 and a proximal end to a power receiving portion (not shown) in the module body 220. The power receiving portion may be implemented using the power converter unit. Thus, the conductive spring 216 may receive the power from the terminal pin 215 and supply the power to the module body 220.

In one implementation, the conductive spring 216 may be coupled to the terminal pin 215 using a heat-bonding.

The pressure structure 217 may be made of an insulating material, for example, a plastic material. The conductive spring 216 may be partially inserted into the pressure structure 217 to be coupled to the terminal pin 215. The pressure structure 217 may slidably move in an upper portion of the housing 218 using an elastic force of the conductive spring 216.

In one implementation, the pressure structure 217 may have a curved bottom corresponding to a curved portion of the conductive spring 216.

The housing 218 may be made of an insulating material, for example, a plastic. The housing 218 may receive the pressure structure 217 and conductive spring 216 therein. The conductive spring 216 may partially extend through the bottom of the housing 210. The pressure structure 217 may partially extend through the top of the housing. Using an elastic force of the conductive spring 216, the pressure structure 217 may slide in and along the housing vertically.

In one implementation, the housing 218 may have curved bottom portions corresponding to a curved portion of the conductive spring 216.

Figure 8:
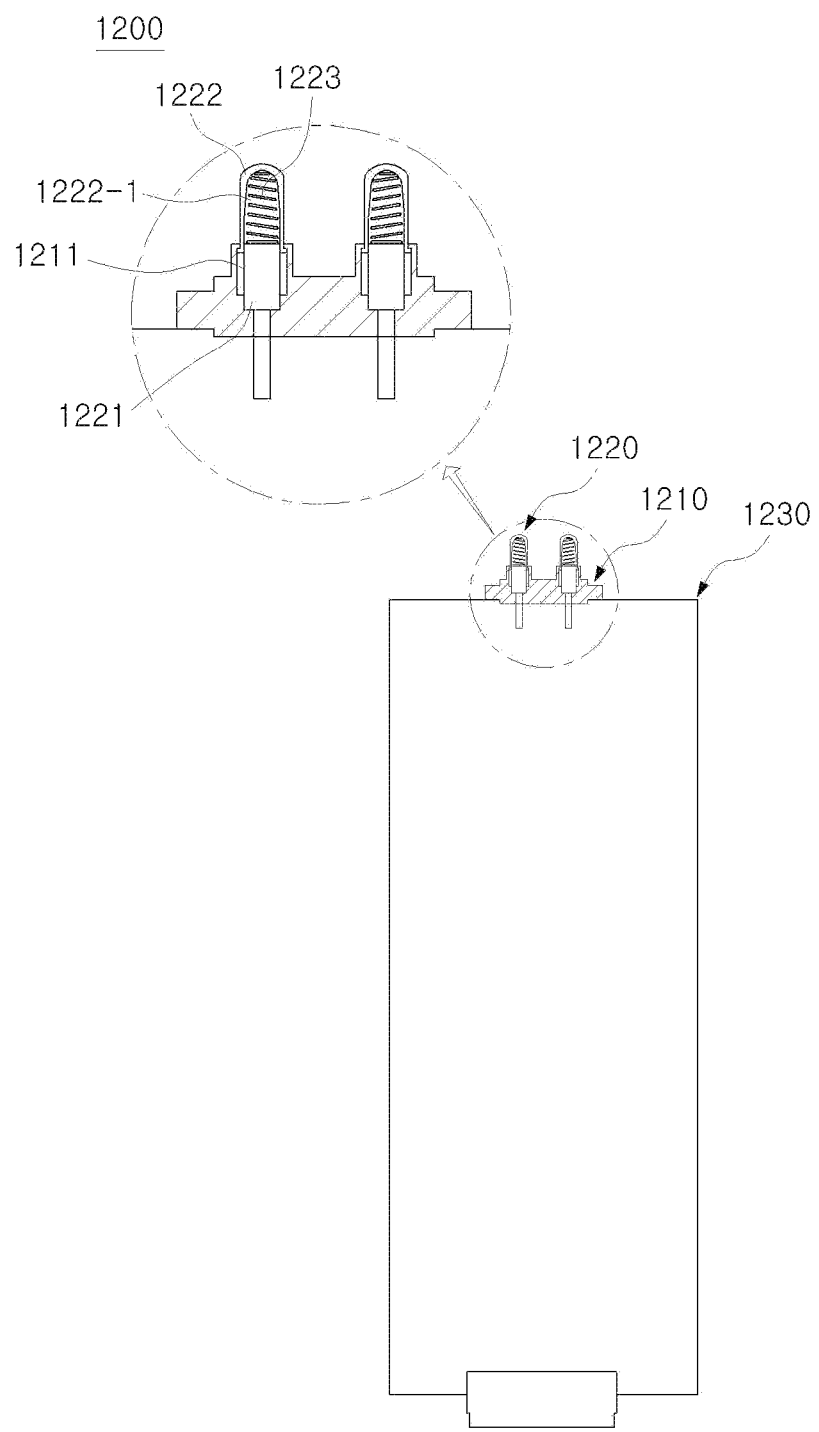
FIG. 8 illustrates a lighting module in accordance with a second embodiment of the present disclosure.

FIG. 8 illustrates a lighting module in accordance with a second embodiment of the present disclosure.

Referring to FIG. 8, the lighting module 1200 may include a connecting means support 1210, two second electrical contacting means 1220 and a module body 1230.

The connecting means support 1210 may support the two second electrical contacting means 1220. For this, the connecting means support 1210 may have two slide grooves 1211 defined therein to receive the two second electrical contacting means 1220 respectively. The connecting means support 1210 may be coupled to the module body 1230 on one end thereof to face the power supply connector 100.

In one implementation, the connecting means support 1210 may be fixed to the module body 1230 in an integrated manner.

The two second electrical contacting means 1220 may be received in the two slide grooves 1211 respectively. When the two second electrical contacting means 1220 are pressure-engaged into the power supply connector 100, the two second electrical contacting means 1220 may apply the elastic force to the power supply connector 100. Further, the second electrical contacting means 1220 may be electrically coupled to the power supply connector to supply the power from the power supply connector 100 to the module body 1230.

In one implementation, each of the second electrical contacting means 1220 may include a second electrical delivery member 1221, a terminal member 1222 and a second elastic member 1223.

The second electrical delivery member 1221 may be received in the slide groove 1211. The second electrical delivery member 1221 may be made of a conductive material, for example, a copper, iron, etc. The second electrical delivery member 1221 may receive the power from the power supply connector 100 and supply the power to the module body 1230. The second electrical delivery member 1221 may at least partially contact, on an outer circumference thereof, the terminal member 1222 to be electrically coupled to the terminal member 1222. Further, the second electrical delivery member 1221 may have one end contacting the second elastic member 1223, thereby to reliably support the second elastic member 1223 during the sliding translation of the terminal member 1222.

The terminal member 1222 may have an accommodation groove 1222-1 defined therein to receive the corresponding second elastic member 1223. The terminal member 1222 may translate along and in the slide groove 1211. The terminal member 1222 may have a free end to contact the power supply connector 100 to transfer the power from the power supply connector 100 via the second electrical delivery member 1221 to the module body 1230 to a light emitting unit in the module body. The terminal member 1222 may be inserted into the engaged groove 111 in the power supply connector 100 while the terminal member 1222 may translate along and in the slide groove 1211. Further, the terminal member 1222 may be made of a conductive material, for example, a copper, iron, etc. so as to transfer the power from the power supply connector 100 to the lighting module 1200.

In one implementation, the terminal member 1222 may partially protrude out of the slide groove 1211 so as to contact the power supply connector 100.

In one implementation, the terminal member 1222 may correspond, in a shape thereof, to a shape of the engaged groove 111 as shown in FIG. 3 and FIG. 4. For example, the terminal member 1222 may correspond, vertically and/or horizontally, to a shape of the engaged groove 111 as shown in FIG. 3 and FIG. 4.

The second elastic member 1223 may be implemented using the spring, for example. The second elastic member 1223 may be received in the accommodation groove 1222-1 in the terminal member 1222. The second elastic member 1223 may apply the elastic force to the terminal member 1222 when the terminal member 1222 is engaged into the power supply connector 100. That is, when the lighting module 200 is engaged into the engaged grooves 111, the second elastic member 1223 may apply the elastic force to the terminal member 1222, such that the terminal member 1222 may slidably translate in and along the slide groove 1211.

Figure 9:
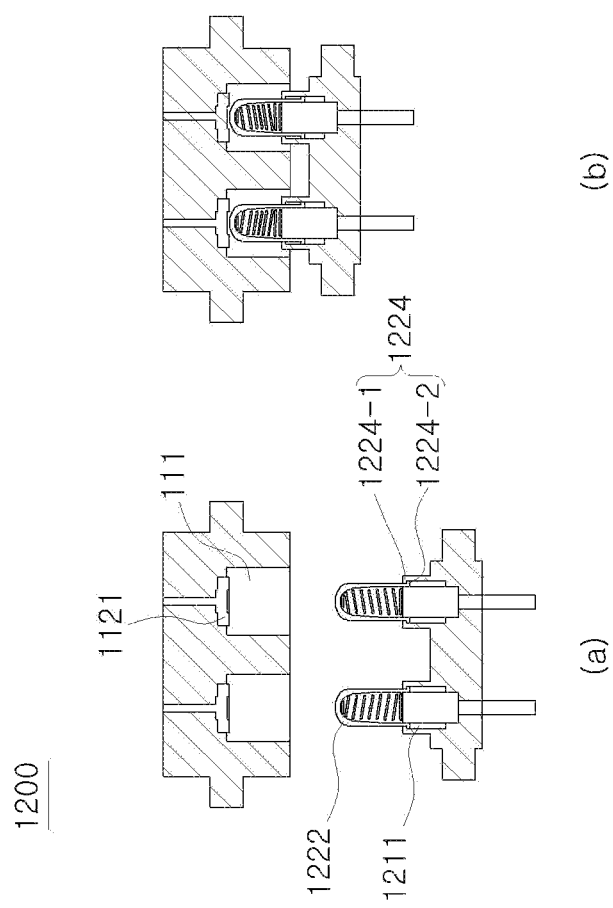
FIG. 9 illustrates an operation of the lighting module in FIG. 8.

In one implementation, the second electrical contacting means 1220 may have a second stopper 1224 as shown in FIG. 9.

The second stopper 1224 may prevent the terminal member 1222 from being fully removed out of the slide groove 1211 due to the elastic force from the second elastic member 1223 when the terminal member 1222 of the lighting module 1200 is fully removed out of the engaged groove 111.

In one implementation, the second stopper 1224 may have a second shoulder 1224-1 and a second stopper protrusion 1224-2 as shown in FIG. 9. The second shoulder 1224-1 and second stopper protrusion 1224-2 may tightly-contact to prevent the terminal member 1222 from being fully removed out of the slide groove 1211 due to the elastic force from the second elastic member 1223 when the terminal member 1222 of the lighting module 1200 is fully removed out of the engaged groove 111.

The second shoulder 1224-1 and second stopper protrusion 1224-2 may tightly-contact to prevent the terminal member 1222 from being fully removed out of the slide groove 1211 due to the elastic force from the second elastic member 1223 when the terminal member 1222 of the lighting module 1200 is fully removed out of the engaged groove 111. For this, the second shoulder 1224-1 may protrude inwardly from the inner face of the slide groove 211. The second shoulder 1224-1 may extend in an annular shape around the inner face of the slide groove 1211. In one embodiment, the multiple second shoulders 1224-1 may be spacedly arranged and each may extend in an annular shape around the inner face of the slide groove 1211.

The second stopper protrusion 1224-2 may protrude outwardly from the outer face of the terminal member 1222. The second shoulder 1224-1 and second stopper protrusion 1224-2 may tightly-contact to prevent the terminal member 1222 from being fully removed out of the slide groove 1211 due to the elastic force from the second elastic member 1223.

The module body 1230 may be coupled to the connecting means support 1210 on one end thereof. The module body 1230 may have the light emitting means, for example, a LED unit, embedded therein. The module body 1230 may have a power converter to convert the AC power received from the terminal member 1222 to a DC power for use in the light emitting means.

FIG. 9 illustrates an operation of the lighting module in FIG. 8.

Referring to FIG. 9, as shown in FIG. 9*a*, the terminal member 1222 may be separated from the power supply connector 100 while the terminal member 1222 partially protrudes out of the slide groove 1211.

Then, as shown in FIG. 9*b*, the terminal member 1222 may be engaged into the engaged groove 111 and contact the first electrical delivery member 121. In this connection, the terminal member 1222 may backward move along and in the slide groove 1211. Thus, the user may slightly insert the lighting module 1200 into the power supply connector 100, on one end of the module 1200, and, at the same time, may couple the lighting module 1200 to the support 300 on the other opposite end of the module 1200. In this way, when the terminal member 1222 may forwardly translate in and along the slide groove 1211, the lighting module 1200 may be reliably secured between the support 300 and the power supply connector 100.

Figure 10:
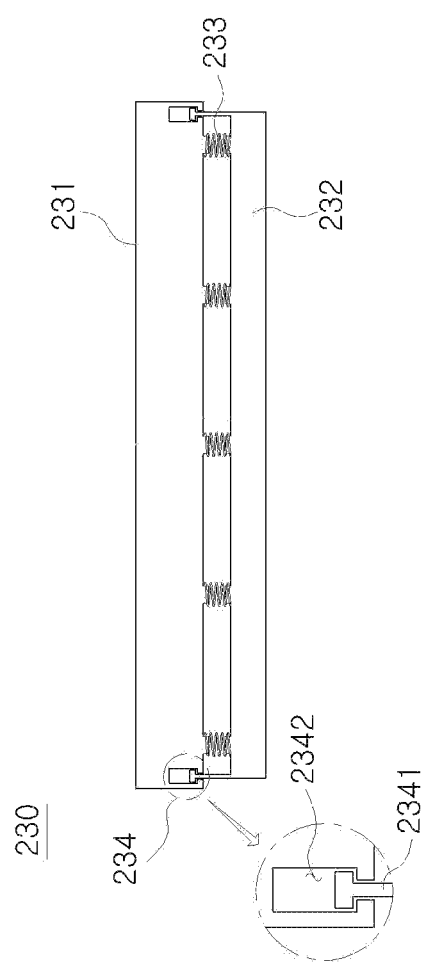
FIG. 10 illustrate the elastic bar in FIG. 5.

FIG. 10 illustrate the elastic bar in FIG. 5.

Referring to FIG. 8, the elastic bar 230 may include a support body 231, a movable body 232 and at least one second elastic member 233.

The support body 231 may have one elongate side coupled to the module body 220, and the other opposite side coupled to the movable body 232. The support body 231 may be coupled to the movable body 232 via the movable joint 234.

The movable body 232 be coupled to the support 300 on one end of the body 231. The movable body 232 be movably coupled to the module body 220 on the other opposite end of the body 232 via the movable joint 234. The movable body 232 be returned to its original position using the second elastic member 233.

In one implementation, the movable joint 234 may have a slide groove 2341 and a slide protrusion 2342.

The slide groove 2341 may be defined in the support body 231 to face the body 232. The slide protrusion 2342 may be pressure-inserted into the slide groove 2341. The slide groove 2341 may have a stopper protrusion to prevent the slide protrusion 2342 from being fully removed out of the slide groove 2341.

The slide protrusion 2342 may protrude from the movable body 232 on one end to face the body 234. The slide protrusion 2342 may be inserted into the slide groove 2341 and freely move in and along the groove 2341. In this connection, the slide protrusion 2342 may have a stopper protrusion having a larger width of the slide protrusion 2342 to prevent the slide protrusion 2342 from being fully removed out of the slide groove 2341.

The second elastic member 233 may be disposed between the support body 231 and movable body 232. The second elastic member 233 may be plural. The second elastic member 233 may be implemented using a spring. Thus, the second elastic member 233 may apply the elastic force to the movable body 232.

Figure 11:
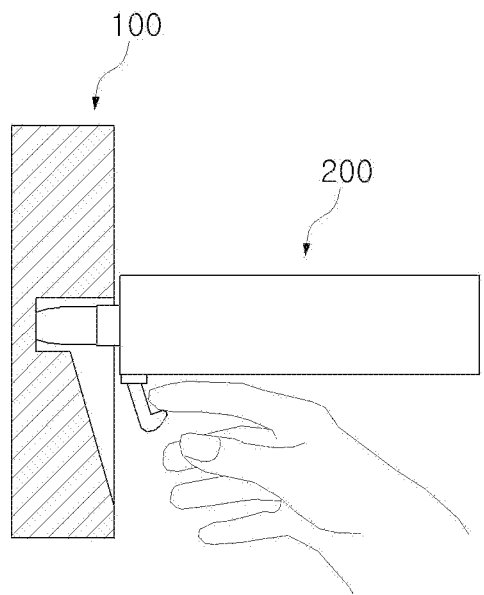
FIG. 11 illustrates a handle member 250 of the lighting module 200 in accordance with one embodiment.
Figure 11:
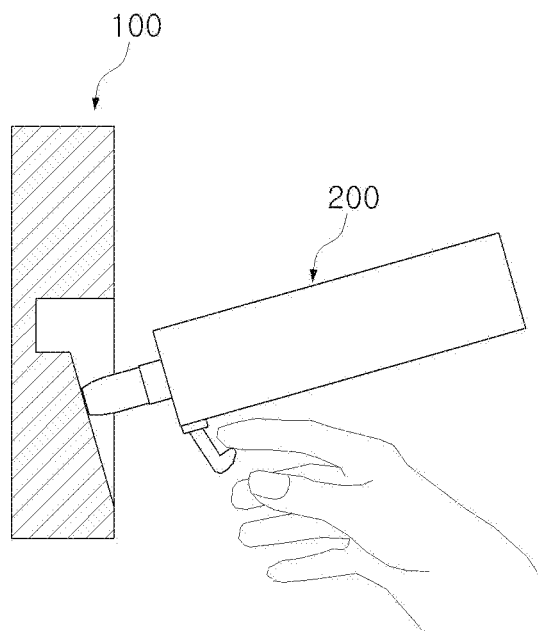

FIG. 11 illustrates a handle member 250 of the lighting module 200 in accordance with one embodiment.

The handle member 250 may be formed on either or both of two opposite elongate sides of the lighting module 200. The user may grip the handle member 250 and lift up or lower down the lighting module 200 using the handle member 250, to engage the lighting module 200 with the power supply connector 100 or separate the lighting module 200 from the power supply connector 100.

Figure 12:
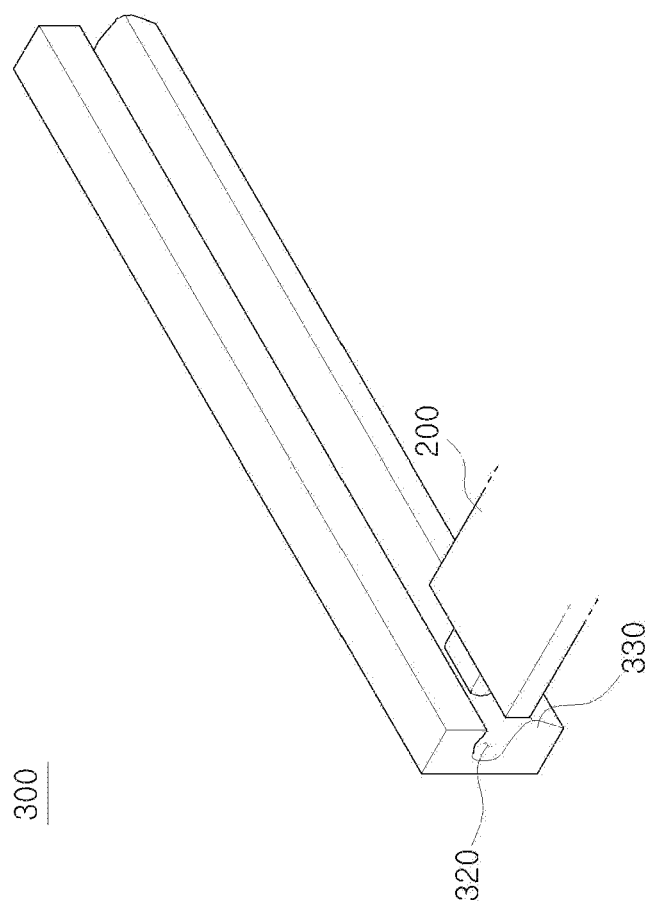
FIG. 12 and FIG. 13 illustrate a support of in accordance with a first embodiment of the present disclosure.
Figure 13:
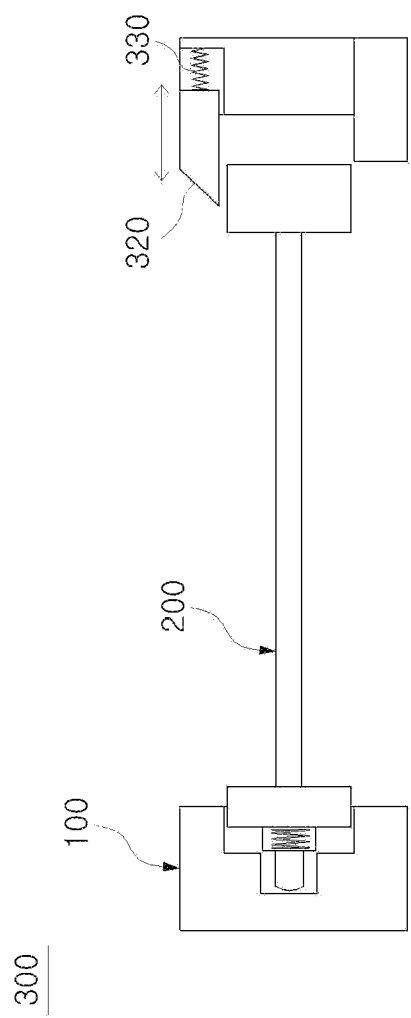

FIG. 12 and FIG. 13 illustrate a support of in accordance with a first embodiment of the present disclosure.

Referring to FIG. 12 and FIG. 13, the support 300 may have an elongate recess 310 defined therein.

The recess 310 may receive one free end of the lighting module 200, more specifically, the elastic bar 230 of the module 200.

The above-configured support 300 may have a tilted fitting member 320 as shown in FIG. 13 and an elastic member 330 as shown in FIG. 13.

The tilted fitting member 320 may be disposed on an upper portion of the support 300. The tilted fitting member 320 may have a tilted face. When the lighting module 200 is being engaged into the recess 310, the tilted fitting member 320 may be pushed upwardly. When the lighting module 200 has been completely engaged into the recess 310, the tilted fitting member 320 may pushed downwardly using the elastic member 330 to secure the lighting module 200.

The elastic member 330 may be coupled between the tilted fitting member 320 and the support 300 to apply the elastic force to the tilted fitting member 320. The tilted fitting member 320 may be implemented using, for example, a spring.

In one implementation, the support 300 may have a slide groove to allow the tilted fitting member 320 to move along the groove. In the groove, the elastic member 330 may be received.

Figure 14:
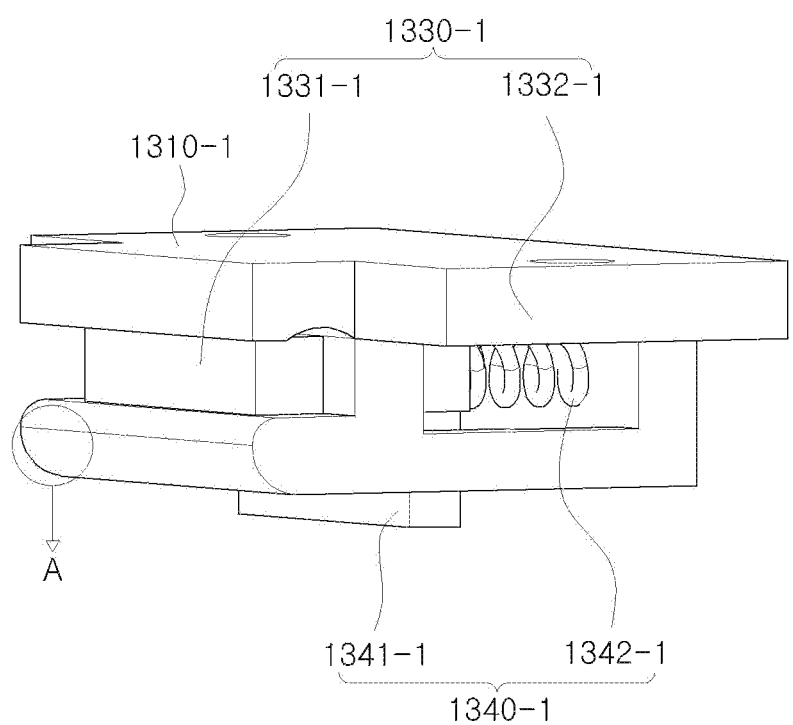
FIG. 14 and FIG. 15 may illustrate a support in accordance with a second embodiment of the present disclosure.
Figure 15:
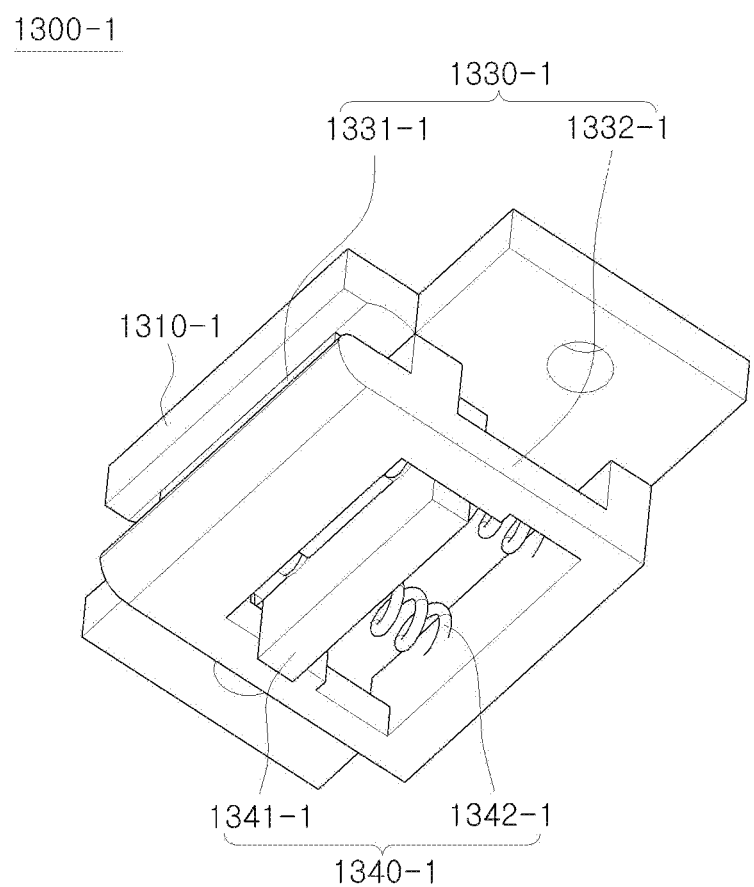

FIG. 14 and FIG. 15 may illustrate a support in accordance with a second embodiment of the present disclosure.

Referring to FIG. 14 and FIG. 15, the support 1300-1 may include a housing member 1310-1, a recess 1320-1, an elastic member 1330-1 and a push mechanism 1340-1.

The housing member 1310-1 may be attached to the frame 1 using a fastener such as a screw or an adhesive. The housing member 1310-1 may correspond, in a shape, to the shape of the frame 1 and lighting module 200. For example, the housing member 1310-1 may have an elongate shape as shown in FIG. 14 and FIG. 15. The housing member 1310-1 may receive the lighting module 200. Further, when the multiple lighting modules 200 are disposed along the frame 1, the housing member 1310-1 may act to combine and support the multiple lighting modules 200. Further, the housing member 1310-1 may be engaged into an inner corner of the lighting module 200.

In one implementation, the housing member 1310-1 may have the recess 1320-1 defined therein for entrance of the lighting module 200. Further, the recess 1320-1 portion may have a tilted face to allow the easy guide of the lighting module 200 therein. For example, the tilt of the tilted face may have 10° to 30°.

In one implementation, the housing member 1310-1 may have the recess 1320-1 defined therein for entrance of the lighting module 200. Further, the recess 1320-1 portion may have an arch shape to allow the easy insertion and separation of the lighting module 200 into and from the recess 1320-1.

The recess 1320-1 may have a corresponding shape to an entrance portion of the lighting module 200. The recess 1320-1 may receive a portion of the lighting module 200 to allow the lighting module 200 to be reliably secured in the housing member 1310-1.

The elastic member 1330-1 may be received in the recess 1320-1. The elastic member 1330-1 may be implemented using, for example, a spring. When the recess 1320-1 receives a portion of the lighting module 200, the elastic member 1330-1 may function to apply the elastic force to the lighting module 200. To be specific, the elastic member may include an elastic unit 1331-1 and cover unit 1332-1.

The elastic unit 1331-1 may be made of a spring, silicon, rubber, any other suitable elastic material. The elastic unit 1331-1 may be received in the recess 1320-1. The elastic force may be applied to the lighting module 200 using a restoring force of the elastic unit 1331-1 when the lighting module 200 is engaged into the recess 1320-1. In this way, when the user intends to install the lighting module 200 to the frame 1 or remove the lighting module 200 from the frame 1, a clearance for installation or removal of the module 200 may be secured by the compressing distance of the elastic unit 1331-1, thereby for the user to easily install the lighting module 200 to the frame 1 or remove the lighting module 200 from the frame 1.

The cover unit 1332-1 may be fixed to the elastic unit 1331-1 on one side thereof, and the cover unit 1332-1 may contact the lighting module 200 on the other opposite side thereof. Thus, the cover unit 1332-1 may transfer a push force from the lighting module 200 to the elastic unit 1331-1. Further, the other opposite side of the cover unit 1332-1 to contact the lighting module 200 may have a coating formed thereon made of a silicon, rubber, synthetic rubber, sponge, etc. Thus, when the lighting module 200 may push-contact the cover unit 1332-1, the cover unit 1332-1 may absorb the impact from the cover unit. This may allow the wear or damage reduction of the lighting module 200 and support 1320-1.

The push mechanism 1340-1 may be disposed in the recess 1320-1. For replacing the lighting module 200, the lighting module 200 may be pushed using the push mechanism 1340-1 to allow the easy separation of the lighting module 200. Specifically, the push mechanism 1340-1 may include a pusher 1341-1 and spring 1342-1.

The pusher 1341-1 may be disposed in the recess 1320-1 and translate in the recess 1320-1 to push the lighting module 200 in a front direction of the lighting module 200. The pusher 1341-1 may vertically protrude out of the housing member 1310-1 to allow an easy grip thereof by the user. In order to allow the pusher 1341-1 to move smoothly, the housing member 1310 may have holes in a pusher 1341-1 movement region.

The spring 1342-1 may be fixed to the pusher 1341-1 at one end of the spring and may be fixed to an inner side of the recess 1320-1 at the other end of the spring. When the lighting module 200 is pushed out of the recess 1320-1, the spring 1342-2 may apply the elastic force to the pusher 1342-2. As shown in FIG. 14 and FIG. 15, the spring 1342-1 may be omitted when the elastic unit 1331-1 is present. That is, the elastic unit 1331-1 may also function as the spring 1342-1. In this connection, the spring 1342-1 may be skipped to simplify the support 1300-1.

Figure 16:
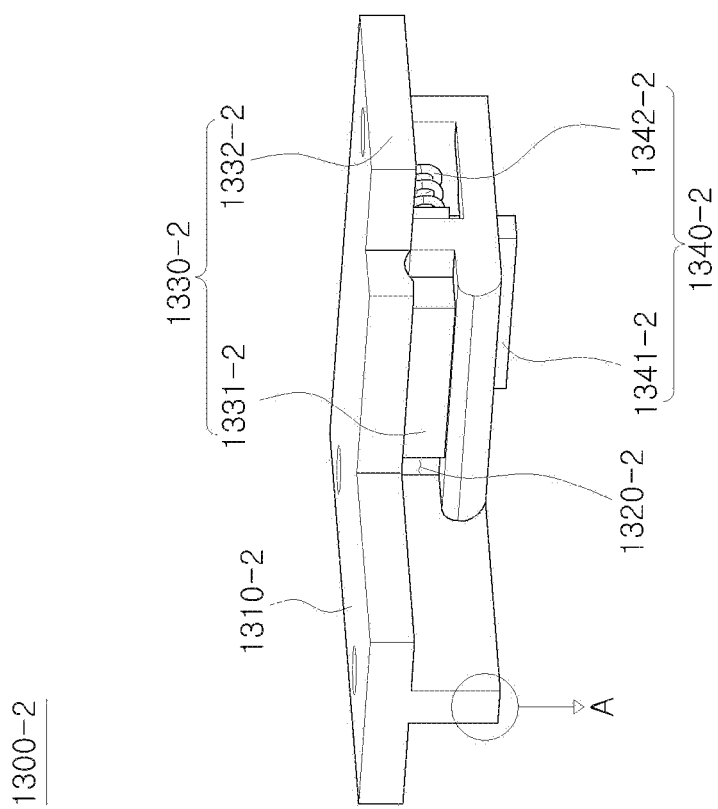
FIG. 16 and FIG. 17 illustrate a support in accordance with a third embodiment of the present disclosure.
Figure 17:
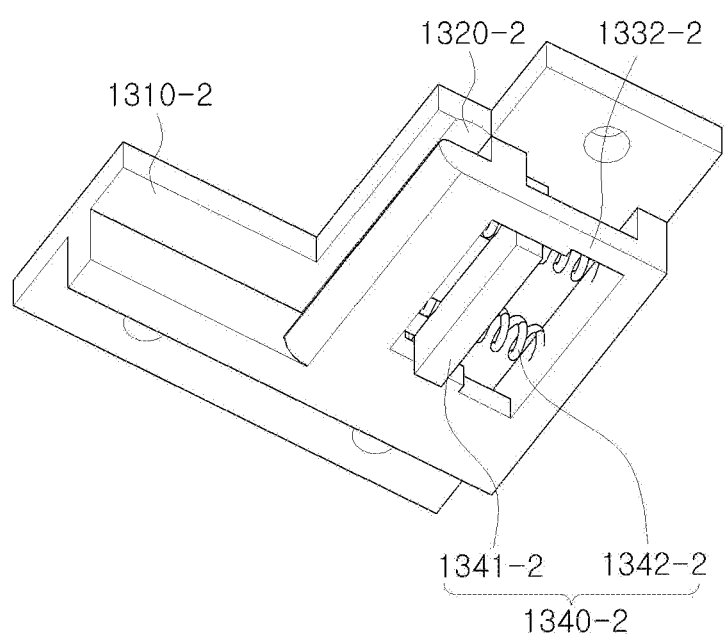

FIG. 16 and FIG. 17 illustrate a support in accordance with a third embodiment of the present disclosure.

Referring to FIG. 16 and FIG. 17, the support 1300-2 in accordance with a third embodiment of the present disclosure may include a housing member 1310-2, a recess 1320-2, an elastic member 1330-2 and a push mechanism 1340-2.

The housing member 1310-2 may be attached to the frame 1 using a fastener such as a screw or an adhesive. The housing member 1310-2 may correspond, in a shape, to the shape of the frame 1 and lighting module 200. For example, the housing member 1310-2 may have a L shape as shown in FIG. 16 and FIG. 17. The housing member 1310-1 may receive the lighting module 200. The housing member 1310-1 may be engaged into an inner corner of the lighting module 200.

In one implementation, the housing member 1310-2 may have the recess 1320-2 defined therein for entrance of the lighting module 200. Further, the recess 1320-2 portion may have a tilted face to allow the easy guide of the lighting module 200 therein. For example, the tilt of the tilted face may have 10° to 30°.

The recess 1320-2 may have a corresponding shape to a corner shape of the lighting module 200. The recess 1320-2 may receive a corner of the lighting module 200 to allow the lighting module 200 to be reliably secured in the housing member 1310-2. The elastic member 1330-2 may be received in the recess 1320-2. The elastic member 1330-2 may be implemented using, for example, a spring. When the recess 1320-2 receives a corner of the lighting module 200, the elastic member 1330-2 may function to apply the elastic force to the lighting module 200. To be specific, the elastic member may include an elastic unit 1331-2 and cover unit 1332-2. The elastic unit 1331-2 may be made of a spring, silicon, rubber, any other suitable elastic material. The elastic unit 1331-2 may be received in the recess 1320-2. The elastic force may be applied to the lighting module 200 using a restoring force of the elastic unit 1331-2 when the lighting module 200 is engaged into the recess 1320-2. In this way, when the user intends to install the lighting module 200 to the frame 1 or remove the lighting module 200 from the frame 1, a clearance for installation or removal of the module 200 may be secured by the compressing distance of the elastic unit 1331-2, thereby for the user to easily install the lighting module 200 to the frame 1 or remove the lighting module 200 from the frame 1.

The cover unit 1332-2 may be fixed to the elastic unit 1331-2 on one side thereof, and the cover unit 1332-2 may contact the lighting module 200 on the other opposite side thereof. Thus, the cover unit 1332-2 may transfer a push force from the lighting module 200 to the elastic unit 1331-1. Further, the other opposite side of the cover unit 1332-2 to contact the lighting module 200 may have a coating formed thereon made of a silicon, rubber, synthetic rubber, sponge, etc. Thus, when the lighting module 200 may push-contact the cover unit 1332-2, the cover unit 1332-2 may absorb the impact from the cover unit. This may allow the wear or damage reduction of the lighting module 200 and support 1320-2.

The push mechanism 1340-2 may be disposed in the recess 1320-2. For replacing the lighting module 200, the lighting module 200 may be pushed using the push mechanism 1340-2 to allow the easy separation of the lighting module 200. Specifically, the push mechanism 1340-2 may include a pusher 1341-2 and spring 1342-2. The pusher 1341-2 may be disposed in the recess 1320-2 and translate in the recess 1320-2 to push the lighting module 200 in a front direction of the lighting module 200. The pusher 1341-2 may vertically protrude out of the housing member 1310-2 to allow an easy grip thereof by the user. In order to allow the pusher 1341-2 to move smoothly, the housing member 1310 may have holes in a pusher 1341-2 movement region. The spring 1342-2 may be fixed to the pusher 1341-2 at one end of the spring and may be fixed to an inner side of the recess 1320-2 at the other end of the spring. When the lighting module 200 is pushed out of the recess 1320-2, the spring 1342-2 may apply the elastic force to the pusher 1342-2.

Figure 18:
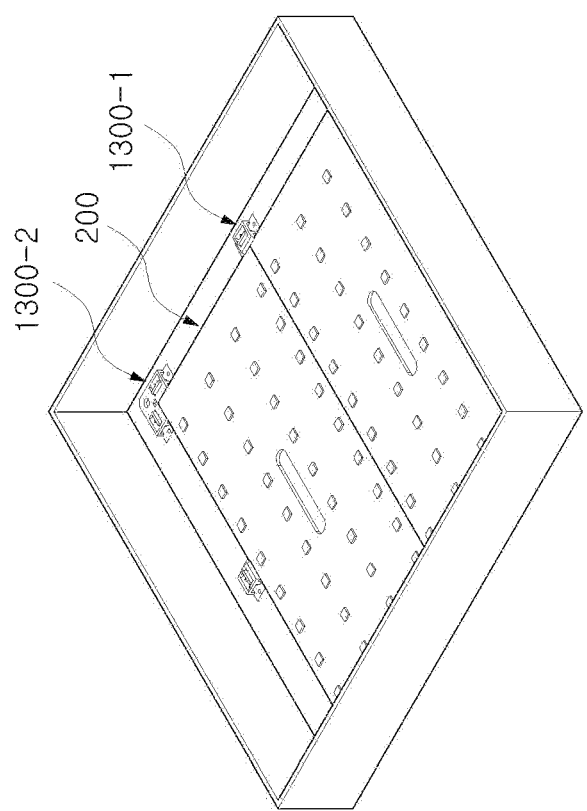
FIG. 18 shows a lighting assembly having the support as shown in FIG. 14 to FIG. 17.

FIG. 18 shows a lighting assembly having the support as shown in FIG. 14 to FIG. 17.

Referring to FIG. 18, the lighting module 200 may be supported by the plurality of the supports 1300-1, 1300-2. In this connection, as shown in FIG. 18, the support 1300-2 in accordance with the third embodiment may have two elastic members 1320-2 in the housing member 1310-2. Thus, this may allow the user to engage the lighting module 200 with the support or disengage the lighting module 200 from the support.

Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A lighting assembly comprising:
a frame;
a power supply connector coupled to the frame at and along a first inner side of the frame, wherein the power supply connector is configured to receive a power from an external power supply;
a support coupled to the frame at and along a second inner side of the frame, wherein the first side is opposite to the second side;
a lighting module disposed between and coupled to the power supply connector and the support, wherein the lighting module is configured to receive the power from the power supply connector, and the lighting module has a lighting element embedded therein,
wherein the lighting module is physically supported by the support;
wherein the lighting module includes a connecting means support, two second electrical contacting means and a module body, wherein the connecting means support supports the two second electrical contacting means, wherein the connecting means support has two slide grooves defined therein to receive the two second electrical contacting means respectively, wherein when the two second electrical contacting means are pressure-engaged into the power supply connector, the two second electrical contacting means applies the elastic force to the power supply connector, wherein the second electrical contacting means is electrically coupled to the power supply connector to supply the power from the power supply connector to the module body, and wherein the module body is coupled to the connecting means support on one end thereof, and the module body includes light emitting means embedded therein.

2. The assembly of claim 1, wherein the power supply connector comprises:
a connector body coupled to the frame at and along the first inner side of the frame, wherein the connector body has at least two engaged grooves defined therein; and
at least two electrical contacting means received in the at least two engaged grooves respectively, wherein when the lighting module is partially inserted into the engaged grooves, the electrical contacting means applies an elastic force to the lighting module, and the electrical contacting means supplies the power to the lighting module.

3. The assembly of claim 2, wherein the electrical contacting means includes:
a first electrical delivery member received in each engaged groove wherein the first electrical delivery member receives a power from the external power supply;
a contact plate received in each engaged groove to translate along and in each engaged groove, wherein the contact plate contacts the lighting module and supplies the power to the lighting module; and a first elastic member disposed between the electrical delivery member and the contact plate, wherein the first elastic member is fixed to the electrical delivery member and the contact plate, wherein when the lighting module is partially inserted into the engaged grooves, the first elastic member applies an elastic force to the contact plate, wherein the power passes from the external power supply via the electrical delivery member, and, then, the first elastic member, and, then, the contact plate, to the lighting module.

4. The assembly of claim 1, wherein the lighting module includes: two contacting plugs to be engaged into the power supply connector;
a module body coupled to the contacting plugs, wherein the module body includes a lighting emitting unit; and
an elastic bar coupled to the module body, wherein the elastic bar is engaged with the support, wherein the elastic bar is disposed between the module body and the support.

5. The assembly of claim 4, wherein each of the contacting plugs includes:
a terminal pin having a distal free end to be coupled to the power supply connector connecting means coupled to the module body, wherein the connecting means has a through hole through which the terminal pin is slidably inserted;
a slider fixed to the terminal pin such that the slider slides together with the terminal pin, wherein the connecting means has a groove to receive the slider such that the slider slidably moves in the groove in the connecting means, wherein the slider returns to its initial position due to a restoring force of a first elastic member; and
the first elastic member disposed between the connecting means and slider, wherein the first elastic member is configured to apply the elastic force to the slider.

6. The assembly of claim 5, wherein the elastic bar includes a support body, a movable body and at least one second elastic member,
wherein the support body has one elongate side coupled to the module body, and the other opposite side coupled to the movable body,
wherein the movable body is coupled to the support on one end of the movable body, and the movable body is movably coupled to the module body on the other opposite end thereof, and, the movable body returns to its original position using the second elastic member, wherein the second elastic member is disposed between the support body and movable body, wherein the second elastic member applies the elastic force to the movable body.

7. The assembly of claim 1, wherein each of the second electrical contacting means includes a second electrical delivery member, a terminal member and a second elastic member,
wherein the second electrical delivery member is received in the slide groove, wherein the second electrical delivery member is configured to receive the power from the power supply connector and supply the power to the module body,
wherein the terminal member has an accommodation groove defined therein to receive the corresponding second elastic member, wherein the terminal member translates along and in the slide groove, wherein the terminal member has a free end to contact the power supply connector to transfer the power from the power supply connector via the second electrical delivery member to the module body,
wherein the second elastic member is received in the accommodation groove in the terminal member, wherein the second elastic member applies the elastic force to the terminal member when the terminal member is engaged into the power supply connector.

8. The assembly of claim 7, further comprising a handle member formed on either or both of two opposite elongate sides of the lighting module,
wherein the handle member is raised up or lowered down to engage the lighting module with the power supply connector or separate the lighting module from the power supply connector.

9. The assembly of claim 1, wherein the support includes a housing member coupled to the frame, wherein the housing member has a recess defined to receive a portion of the lighting module.

10. The assembly of claim 9, wherein the support further includes an elastic member received in the recess, wherein when the recess receives a portion of the lighting module, the elastic member applies the elastic force to the lighting module.

11. The assembly of claim 10, wherein the elastic member includes an elastic unit and a cover unit, wherein the elastic unit is received in the recess, wherein the elastic force is applied to the lighting module using a restoring force of the elastic unit when the lighting module is engaged into the recess,
wherein the cover unit is fixed to the elastic unit on one side thereof, and the cover unit contacts the lighting module on the other opposite side thereof, wherein the cover unit transfers a push force from the lighting module to the elastic unit.

12. The assembly of claim 9, wherein the housing member further includes a push mechanism disposed in the recess, wherein the lighting module is pushed using the push mechanism.

13. The assembly of claim 12, wherein the push mechanism includes a pusher and a spring, wherein the pusher is disposed in the recess and translates in the recess to push the lighting module in a front direction of the lighting module,
wherein the spring is fixed to the pusher at one end of the spring and is fixed to an inner side of the recess at the other end of the spring, wherein when the lighting module is pushed out of the recess, the spring applies the elastic force to the pusher.

14. The assembly of claim 9, wherein the recess has an inner tilted face.

15. The assembly of claim 9, wherein the housing member has a L shape, wherein the housing member is engaged into a corner of the lighting module.

16. The assembly of claim 15, wherein the housing member receives a plurality of elastic members therein.

* * * * *